June 23, 1925.

D. L. LOTT

SCREW GEARING

Filed June 2, 1923

1,543,173

Inventor
D. L. Lott
By C. A. Snow & Co.
Attorneys.

Patented June 23, 1925.

1,543,173

UNITED STATES PATENT OFFICE.

DANIEL L. LOTT, OF TIFFIN, OHIO, ASSIGNOR TO THE LOOMIS MACHINE COMPANY, OF TIFFIN, OHIO.

SCREW GEARING.

Application filed June 2, 1923. Serial No. 643,053.

*To all whom it may concern:*

Be it known that I, DANIEL L. LOTT, a citizen of the United States, residing at Tiffin, in the county of Seneca and State of Ohio, have invented a new and useful Screw Gearing, of which the following is a specification.

This invention relates to drilling machines such as used in boring wells, blast holes, and the like and relates more particularly to machines of this character driven by electric motors.

Where electrically operated drilling machines are used, it is of course necessary to have somewhere in the vicinity thereof a wire for conducting current. As the machine must be moved from place to place under some conditions, such as in quarry work, it has been the practice to use a long cable for conducting current from the main line to the motor. Owing to the length and weight of this cable, the services of several men have been required to carry the cable when the machine is moved from place to place. Furthermore, the constant dragging of the cable over the rough surface soon wears it so as to render it unfit for use.

One of the objects of the present invention is to combine with an electrically operated drilling machine a means whereby the cable can be taken up or wound so as to eliminate practically all slack when the machine is moved in one direction, it being possible to release the winding means to allow the cable to pay out freely when the machine is moving in the opposite direction.

A further object is to provide take-up mechanism for a cable, which is simple, durable and compact, can be controlled readily, and can be applied easily to electrically driven machines already in use.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings—

Figure 1:
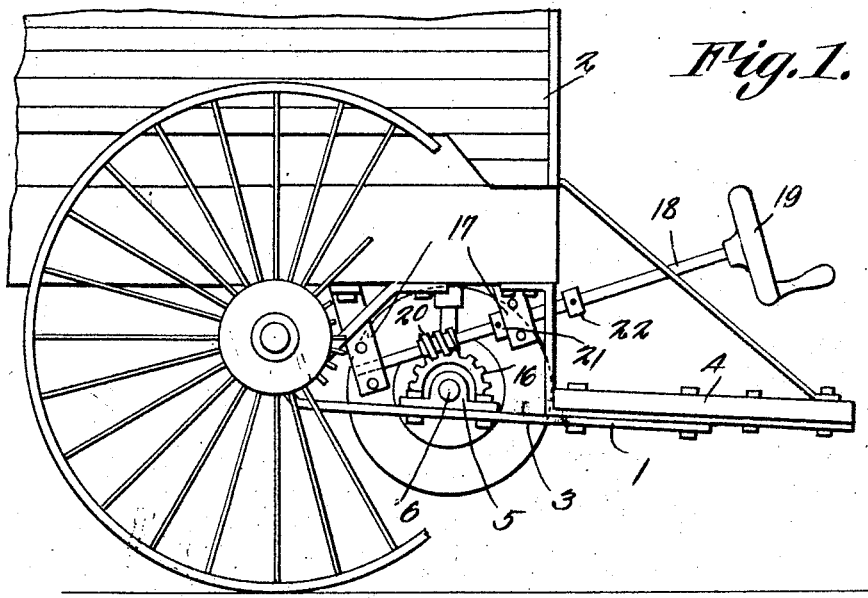
Figure 1 is a side elevation of a portion of an electrically operated drilling machine, parts being broken away to show the take-up mechanism in side elevation.
Figure 2:
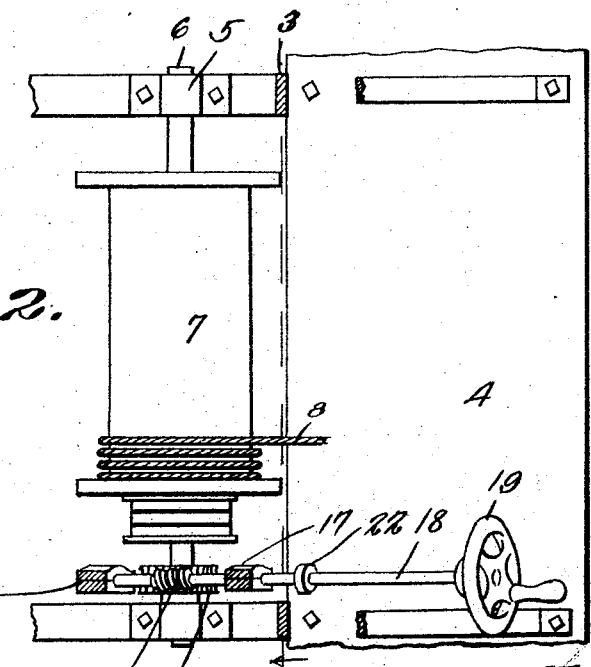
Fig. 2 is a plan view of the take-up mechanism.

Referring to the figures by characters of reference, 1 designates a portion of a drilling machine, the same including a housing 2 in which the motor, not shown, is located. The present invention includes a frame 3 for attachment to the bottom of the housing 2, this frame including a platform 4 and providing bearings 5 for a transverse shaft 6 located under the housing 2. Secured to the shaft 6 so as to rotate therewith is a reel or drum 7 and the conducting cable 8 is extended at one end into this drum or reel and through the head or end 9 thereof as shown in Fig. 4. Cable 8 is used for conducting the current to the machine from a main line which can be at a considerable distance from the machine.

Secured to the shaft 6 so as to rotate therewith is a worm gear 16 and slidably and rotatably supported above this gear within hangers 17 is a shaft 18. This shaft is adapted to be rotated by means of a hand wheel 19 or the like and has a worm gear 20 designed to mesh with gear 16. Collars 21 and 22 are secured to shaft 18 at opposite sides of one of the hangers 17 and are so spaced as to allow a limited sliding movement of the shaft within the hangers. The parts are so positioned that when the shaft 18 is at one limit of its sliding movement, the worm 20 is in mesh with gear 16 and by then rotating the shaft 18, this worm will rotate gear 16 and reel or drum 7 and cause the cable 8 to be wound on the reel or drum. Obviously, this action will cause a longitudinal thrust through one collar 21 against hanger 17 so that the worm and gear will be held in mesh during the winding operation. When it is desired to release the reel or drum so as to allow the cable to unwind therefrom freely, the operator thrusts shaft 18 longitudinally to force worm 20 out of mesh with gear 16 and bring the other collar 22 against the adjacent hanger 17. As soon as the worm and gear become unmeshed, the reel or drum is released and when the machine is driven forward, the cable 8 again unwinds. Whenever it is desired to take up slack in the cable, as when the machine is moved rearwardly or toward the main electric line, the operator pulls shaft 18 to a position shown in Fig. 1, thereby bringing worm 20 into mesh with gear 16. By then rotating the shaft 18 in the proper direction, the cable will be taken up as heretofore explained. The unmeshing of the worm and gear can be of course facilitated by rotating shaft 18 to unwind the cable and at the same time push shaft 18 to disengage the worm from the gear.

The herein described mechanism has been found to be of great utility and has effected a considerable saving of time heretofore expended in the slow process of carrying and winding the conducting cable of an electric machine of this type.

While the improvements are designed especially for use with drilling machines, it is to be understood that they can be used with other forms of large portable electrically operated machines.

What is claimed is:—

A take-up of the class described including a gear, a slidable and rotatable shaft, a worm upon the shaft, said shaft being slidable in one direction to disengage the worm from the gear and slidable in the opposite direction to bring the worm into mesh with the gear, means for limiting the movement of the shaft in each direction, one of said means constituting a thrust bearing for the shaft while the worm and gear are in mesh.

In testimony that I claim the foregoing as my own, I have hereto affixed my signature in the presence of two witness.

DANIEL L. LOTT.

Witnesses:
C. H. RUNYAN,
E. M. NEWSON.